United States Patent
Iltus

(10) Patent No.: US 9,560,197 B2
(45) Date of Patent: *Jan. 31, 2017

(54) METHOD AND SYSTEM FOR INFORMING A USER THAT A CALL IS NO LONGER ON HOLD

(71) Applicant: VONAGE AMERICA INC., Holmdel, NJ (US)

(72) Inventor: Sagi Iltus, Hadera (IL)

(73) Assignee: Vonage America Inc., Holmdel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,076

(22) Filed: Jun. 3, 2016

(65) Prior Publication Data

US 2016/0286042 A1 Sep. 29, 2016

Related U.S. Application Data

(63) Continuation of application No. 14/143,136, filed on Dec. 30, 2013, now Pat. No. 9,380,159.

(51) Int. Cl.

| | |
|---|---|
| H04M 3/428 | (2006.01) |
| H04M 3/42 | (2006.01) |
| H04W 4/12 | (2009.01) |
| H04M 1/60 | (2006.01) |
| H04M 1/725 | (2006.01) |
| H04W 68/02 | (2009.01) |
| H04W 4/16 | (2009.01) |

(52) U.S. Cl.
CPC ......... *H04M 3/4286* (2013.01); *H04M 1/6033* (2013.01); *H04M 1/72563* (2013.01); *H04M 3/4285* (2013.01); *H04M 3/42221* (2013.01); *H04W 4/12* (2013.01); *H04W 4/16* (2013.01); *H04W 68/02* (2013.01)

(58) Field of Classification Search
CPC .............. H04M 3/4286; H04M 1/6033; H04M 1/72563; H04M 3/42221; H04M 3/4285; H04W 4/12; H04W 4/16; H04W 68/02
USPC .......................... 379/201.01, 215.01, 266.06
See application file for complete search history.

(56) References Cited

U.S. PATENT DOCUMENTS

| | | | |
|---|---|---|---|
| 8,121,262 B1* | 2/2012 | Michaelis | H04M 1/72513 379/88.11 |
| 8,619,965 B1 | 12/2013 | Figa et al. | |
| 9,380,159 B2* | 6/2016 | Iltus | H04M 3/4286 |
| 2003/0043990 A1 | 3/2003 | Gutta et al. | |
| 2005/0147227 A1 | 7/2005 | Chervirala et al. | |
| 2015/0189089 A1* | 7/2015 | Iltus | H04M 3/4286 379/266.06 |

FOREIGN PATENT DOCUMENTS

WO WO-9720421 6/1997

\* cited by examiner

*Primary Examiner* — Harry S Hong
(74) *Attorney, Agent, or Firm* — Moser Taboada; Joseph Pagnotta

(57) ABSTRACT

Methods and systems for detecting completion of hold time for a user on a call are provided herein. In some embodiments, a method for detecting completion of hold time for a user on a call may include monitoring an audio signal of a call that has been placed on hold between a first device associated with the user and a first entity, determining a change in the monitored audio signal that indicates that the call is no longer on hold and generating a first alert to inform the user that the call is no longer on hold.

16 Claims, 4 Drawing Sheets

METHOD AND SYSTEM FOR INFORMING A USER THAT A CALL IS NO LONGER ON HOLD

CROSS-REFERENCE TO RELATED APPLICATION

This application is a continuation of co-pending U.S. patent application Ser. No. 14/143,136, filed Dec. 30, 2013, which is incorporated herein by reference in its entirety.

BACKGROUND

Field

Embodiments of the present invention generally relate to detecting completion of hold/wait time for a customer on a call.

Description of the Related Art

Telephone-based customer support is one of the most common ways customers are able to seek support for their purchase, technical issues, or the like. However, as this form of customer support gains popularity, more customers tend to call in requesting support. Increased customer volume contributes towards long wait-times for each customer placed on hold until a customer service representative becomes available to assist the customer. This causes the customer to grow frustrated or perform other tasks while they are on hold. Oftentimes, the support line may play music, or informational/advertising messages, while the customer waits on hold. While on hold, the customer must be actively monitoring the call to listen for a customer service representative that has become available. If the customer is not constantly monitoring the call, the customer may miss the completion of the music and may miss the beginning of the support call with the live customer service representative.

Therefore, there is a need in the art for detecting completion of hold/wait time on a call and alerting a customer that the call is no longer on hold in accordance with exemplary embodiments of the present invention.

SUMMARY

Methods and systems for detecting completion of hold time for a user on a call are provided herein. In some embodiments, a method for detecting completion of hold time for a user on a call may include monitoring an audio signal of a call that has been placed on hold between a first device associated with the user and a first entity, determining a change in the monitored audio signal that indicates that the call is no longer on hold and generating a first alert to inform the user that the call is no longer on hold.

In some embodiments, an system for alerting a user that a call is no longer on hold is further provided herein. In some embodiments, an apparatus for alerting a user that a call is no longer on hold may include a monitoring module configured to: (a) monitor an audio signal of a call that has been placed on hold between a first device associated with the user and a first entity; (b) determine a change in the monitored audio signal that indicates that the call is no longer on hold; and (c) generate a first alert to inform the user that the call is no longer on hold.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
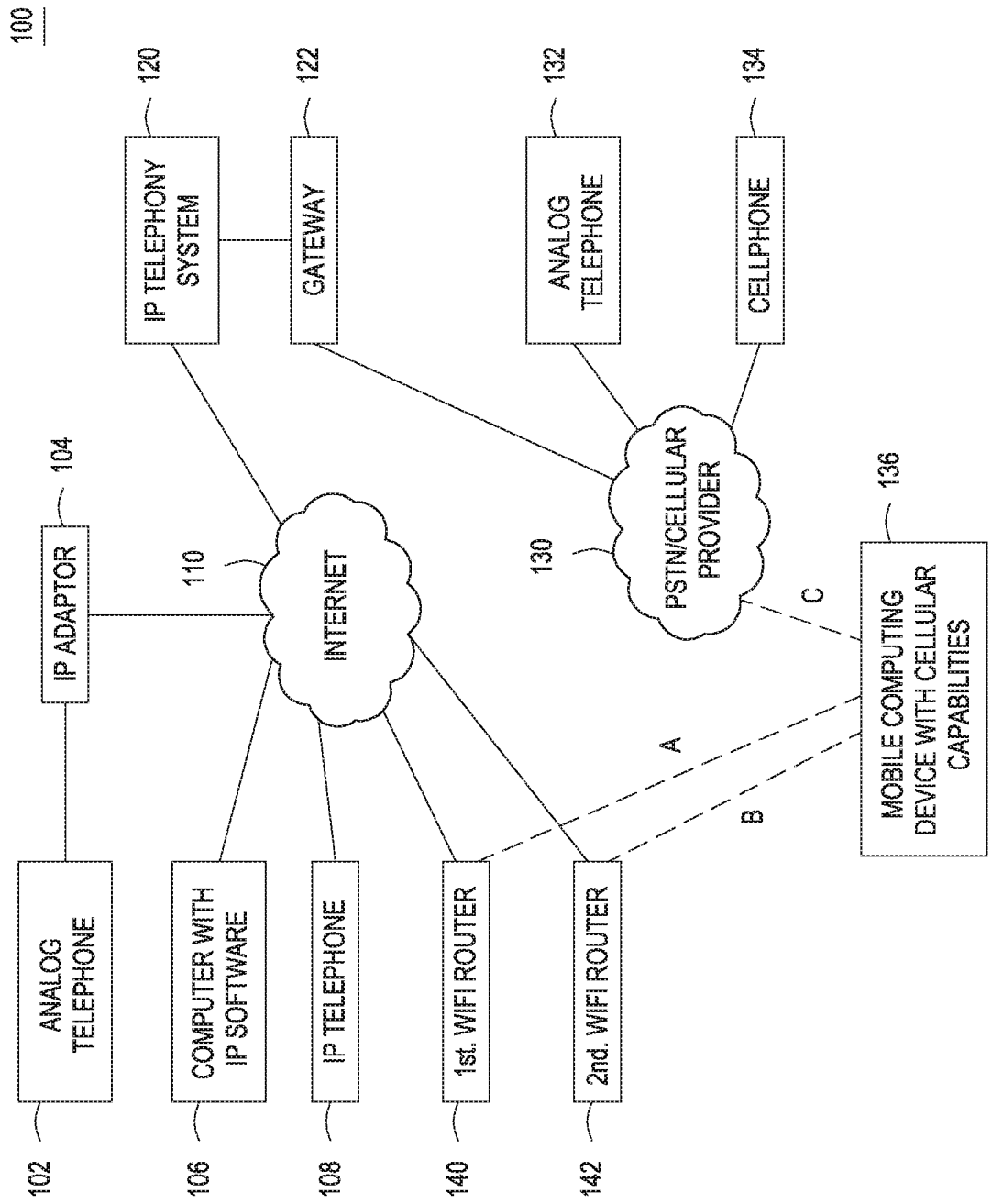
FIG. 1 is a depiction of a communications environment provided to facilitate IP enhanced communications in accordance with exemplary embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for detecting completion of hold time for a user on a call. According to one embodiment, a user, or customer, calls into a customer service department and is placed on hold by a representative while music plays, referred to herein as waiting music or hold music. In some instances, the waiting music may be interrupted by commercial advertisements, or vocal notifications regarding the wait-time for speaking to a customer service representative. The completion of the waiting music, and/or other information/advertising messages, is detected by the customer's phone, or a service offered by the carrier service. If it is determined that a customer service representative's voice follows, the customer is alerted to the customer service representative's engagement of the call. This allows customers to engage in other activities without worrying about a long wait-time to speak to the customer service representative. The alert allows the customer to react quickly when the customer service representative becomes available.

In the following description, the terms VOIP system, VOIP telephony system, IP system and IP telephony system are all intended to refer to a system that connects callers and that delivers data, text and video communications using Internet protocol data communications. Although described below in terms of a VOIP telephony system, those of ordinary skill in the art will recognize that embodiments of the present invention are not limited to use with IP telephony systems and may also be used in other systems described below.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may be provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an APPLE iPhone™, a RIM BLACKBERRY or a comparable device running GOOGLE's ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A with a first wireless access point 140, such as a WIFI or WIMAX router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish a third wireless data connection C via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WIMAX standard.

Figure 2:
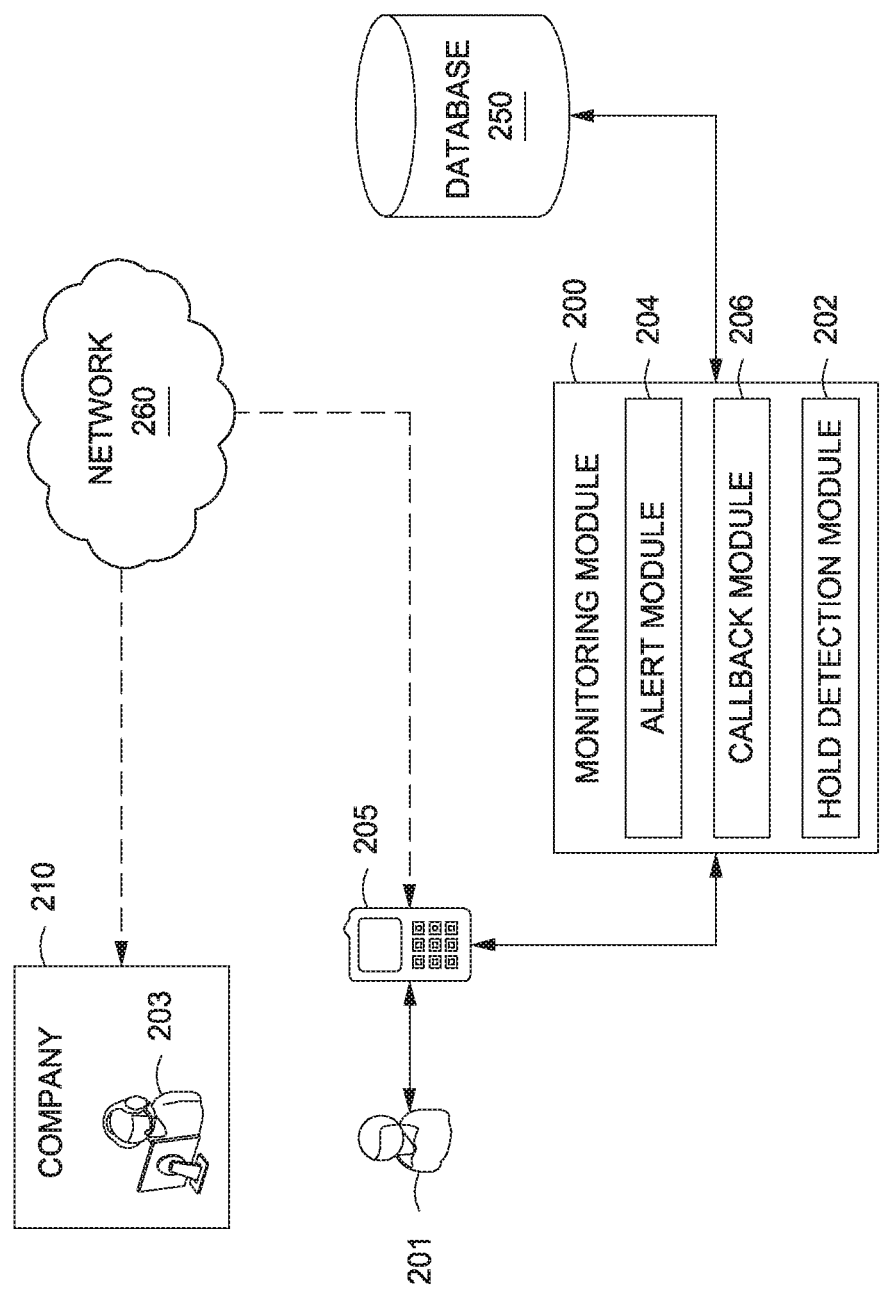
FIG. 2 is a block diagram of a monitoring module in accordance with exemplary embodiments of the present invention.

FIG. 2 is functional block diagram of a system including a monitoring module 200 for monitoring a call between a user and an entity in accordance with exemplary embodiments of the present invention. The monitoring module 200 comprises a hold detection module 202, an alert module 204 and a callback module 206. The monitoring module 200 may be operatively coupled to a database 250. In some embodiments, the operative coupling may be through a wired or wireless network.

In an exemplary scenario, customer 201 uses device 205 (e.g., cellphone 134, analog telephone 132 or mobile computing device 136) to contact the customer service department of a company 210 for a particular product, service or the like. Oftentimes the customer 201 will be immediately placed on hold. In other instances, a customer service representative (CSR) 203 from the company 210 may answer the customer's call, and subsequently place the customer 201 on hold for an extended period of time. In either instance, the call may be established by a telephone service provider system (such as, for example, IP telephony system 120) over a communication network 260 (i.e., the internet 110 PSTN 130, or the like). During the hold period of the call, the company 210 may play some hold music or messages repeatedly indicating that the call is still on hold. In some systems, the hold music may be interrupted occasionally to allow the company 210 to give the customer 201 a status message or a commercial advertisement. In some systems, once the holding music stops, it can be assumed that the holding period is finished and the customer 201 may discuss their concerns with the customer service representative 203. In other systems, no hold music is played and only informational or advertising messages are played. In rare instances, nothing is played while the customer is on hold.

Once the call is placed by customer 201 to the company 210, the monitoring module 200 begins monitoring the call. After the customer 201 is placed on hold (e.g., either via an automated telephone system or by the CSR 203), the hold detection module 202 detects or otherwise monitors whether the customer 201 is still on hold. According to some embodiments the hold detection module 202 analyzes the audio signal of the call between customer 201 and CSR 203 to determine if a CSR 203 is available (i.e., that the hold time has ended). In some embodiments, the hold detection module 202 may determine that the hold time has ended by determining one or more of the following: (a) that the waiting/hold music has ceased, (b) human speech from the CSR 203 is detected, (c) whether there is a change from a recorded message to a live CSR 203 based on audio patterns of the audio signal, (d) recognizing specific keywords or phrases that the CSR 203 is likely to say when they become available, and the like. After the hold detection module 202 determines that that the hold music has ended or that a CSR 203 is available, the hold detection module 202 invokes the alert module 204.

In some embodiments, when the hold detection module 202 detects that the call has been put on hold, the hold detection module 202 may disconnect the call and invoke callback module 206 to send a request to the carrier network 260 to initiate a callback from company 210 to customer 201 when a CSR 203 is available. Before doing so, the monitoring module 200 may inform the customer 201, or otherwise obtain permission from the customer 201 that the call will be disconnected and that they will receive a callback from the company 210 when a CSR 203 is available.

In some scenarios, a call is received by the customer while the customer is waiting on hold. According to one embodiment of the present invention, the monitoring module 200 rejects the incoming call as if the user was actively waiting for the CSR 203. In another embodiment, if the user answers the incoming call, the monitoring module 200 terminates the call between customer 201 and company 210 and the customer 201 will have to dial support again. In yet another embodiment, if the user answers the incoming call, the monitoring module 200 continues to monitor the support call to determine whether the hold period if complete. If a CSR engages the support line before the other call is complete, the alert module 204 transmits an automated voice message to the CSR such as "please wait for the user to connect", or the like indicating that the customer 201 will join the call shortly. The alert module 204 alerts the customer 201 by transmitting alert information to the device 205 to indicate that a CSR 203 is available and on the line and the customer 201 may now engage with the CSR 203. The alert module 204 obtains configuration information from database 250 to determine how the customer 201 has configured their alert preferences and alerts the customer 201 accordingly. In some embodiments, the customer 201 is alerted by the alert module 204 by instructing the device 205 to emit an audio notification and/or a graphical notification portion. The audio notification may be set to the ringtone, notification tone, a predefined tone, or the like, of customer 201.

In some embodiments, where the hold detection module 202 detects speech of the CSR 203, the hold detection module 202 invokes the alert module 204 to alert the customer 201 to the presence of the CSR in different ways. For example, in some embodiments, the alert module 204 may further place the device 205 in "speakerphone" mode, so the customer 201 hears the voice of the CSR loudly.

In some embodiments, the hold detection module 202 or the alert module 204 plays back an automated message to the CSR 203 indicating that the customer 201 will soon engage the CSR 203. The automated message may be adjusted or preconfigured by the customer 201. Those of ordinary skill in the art will recognize that any automated message or automated technique may be performed at the end of the hold time.

Figure 3:
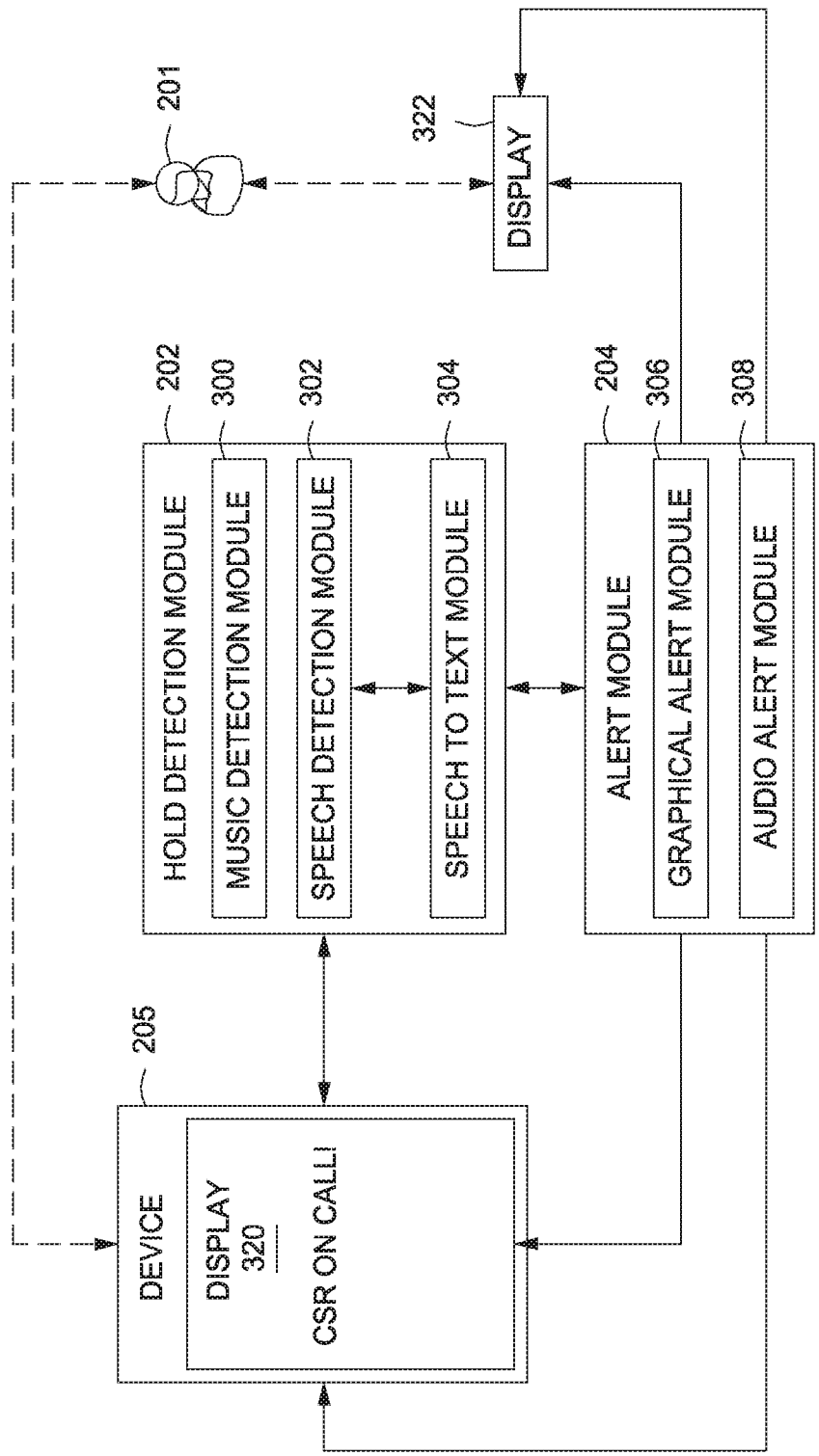
FIG. 3 is a block diagram of a hold detection module and an alert module in accordance with exemplary embodiments of the present invention.

FIG. 3 is a block diagram of the hold detection module 202 and the alert module 204 in accordance with exemplary embodiments of the present invention. The hold detection module 202 comprises a music detection module 300, a speech detection module 302 and a speech to text module 304. The alert module 204 comprises a graphical alert module 306 and an audio alert module 308. In some embodiments, the hold detection module 202 and the alert module 204 are executed on the device 205. In other embodiments, the hold detection module 202 and the alert module 204 are services that are executed on servers over the internet 110, for example, on a telephone carrier service or the like. In other instances, the alert module 204 is executed on the device 205 and the hold detection module 202 is executed in a remote network location.

The hold detection module 202, as described above, samples the audio signal of a telephone call between customer 201 and CSR 203 according to a periodic frequency. In other embodiments, the audio signal of the call is sampled continuously once either the customer 201 enables the hold detection module 202 via a software application on the device 205, or once the hold detection module 202 is automatically enabled. In some embodiments, the sampled audio is sampled and stored on device 205 storage or external storage, or analyzed in real-time to determine whether the customer 201 is placed on hold.

According to exemplary embodiments, the hold detection module 202 comprises built in functionality for accepting user feedback when detecting and responding to false positives. For example, in some instances a user may be on hold for an extended period of time, and the hold music being played over the call may be periodically interrupted with audio advertisements, or audio indicating the status of the call in the answer queue for company 210. The hold detection module 202 may invoke the alert module 204 that customer 201 is no longer on hold because it has detected speech or detected the completion of the music. In these instances, the hold detection module 202 accepts feedback from the customer 201 indicating that the detected speech, or completion of hold music, was merely temporary, because the music continued afterwards. The hold detection module 202 accepts this feedback and adapts to future calls. For example, the hold detection module 202 may recognize that the tone of the detected speech is similar to the tone of the advertisement previously rejected by the customer 201 as a false positive, and continue to monitor the line for hold music completion. Data associated with the false positive flagging can be stored in the database 250 for use by the hold detection module 202 to apply to other customer hold scenarios in the future.

The music detection module 300 analyzes the sampled audio, whether stored in local storage, remote storage, or the like, and determines whether music is being played. If the music detection module 300 determines that music is being played, then the music detection module 300 will determine that the customer 201 has been put on "hold" and notifies the hold detection module 202 that the customer 201 is in a hold state. While the customer 201 is in hold state, the hold detection module 202 will not signal the alert module 204. As the music detection module 300 continues to sample the audio signal of the call, the music detection module 300 determines that the music has stopped playing. According to one embodiment, this is determined by comparing the signal previously sampled with the signal currently sampled. If the samples differ, or if the latter signal is "empty", then the music detection module 300 signals the hold detection module 202 that the customer 201 is no longer in the hold state. In other embodiments, if the sampled audio matches specific predefined criteria, such as, for example, certain frequency magnitudes and durations, the music detection module 300 determines that music is playing or not. In some embodiments, once the music detection module 300 determines that music is no longer playing, it will notify the hold detection module 202 that the customer 201 is in a transition state (i.e., that a CSR 203 is, or may soon be, available).

According to some embodiments, the speech detection module 302 is used to determine whether a CSR has engaged the line, as an alternative to using the music detection module 300. The speech detection module 302 monitors the audio signal of the call and determines whether speech is detected. If speech is detected, the audio signal of the call is continually monitored to determine whether the speech is followed by music. If the speech is followed by music, the customer 201 is still on hold. However, if the speech is followed by silence, then the hold detection module 202 determines that customer 201 is no longer on hold. In some embodiments, the speech to text module 304 parses the audio signal of the call and transcribes the message to text. The text is then displayed on one or more of the display 320, and display 322 by the graphical alert module 306. According to one embodiment, the customer 201 enables speech-text transcription for the entire conversation. The speech to text module 304 transcribers the call and stores the transcription for later access. Accordingly, when referring to a previous support call, the user has a transcript of the entire call to demonstrate prior offers, concessions, or the like. In some embodiments, the music detection module 300 detects music, and if the speech detection module 302 detects speech, the hold detection module 202 plays a prerecorded portion of speech of the customer 201 to keep the CSR on the call. For example, the prerecorded speech may be the user introducing themselves, or greeting the CSR.

Once in the transition state, the hold detection module 202 invokes the alert module 204. The alert module 204 generates an alert according to a customer's preconfigured alert preferences. According to one embodiment, the alert module 204 invokes the audio alert module and/or the graphical alert module 306. The audio alert module 308 triggers an audio alert on the device 205, such as an audio notification with a notification tone set to the customer ring tone, notification tone, predefined musical tone, or the like. In another embodiment, the graphical alert module 306 triggers a graphical alert to be displayed on the device 205.

In embodiments where the alert module 204 is executed on the device 205, the graphical alert module 306 can be given control of the display 320 to display a textual alert, or the text of the CSR 203. In those embodiments, the audio alert module 308 alters the configuration of the device 205 to put the phone in speakerphone mode where call volume is significantly elevated so that a customer hears the CSR 203 even if the customer is not proximate the phone.

Similarly, the alert module 204 can be configured to transmit the alert information to device 205, and the device 205 displays the graphical alert on display 320, or the speaker of device 205 plays the audio alert. The alert module 204 has access to other alternate devices associated with the user such as display 322. The graphical alert module 306 transmits graphical alert information to the display 322, which then displays the text of the CSR's speech. Alternatively, the graphical alert information displays text or graphics notifying the customer 201 that the CSR has engaged the line. The audio alert module 308 transmits audio alert information to the display 322, which may also have a speaker. The display 322 then plays the audio alert according to the audio alert information. This allows the customer 201 to watch television, for example, while waiting to be taken off of hold on the support line.

Figure 4:
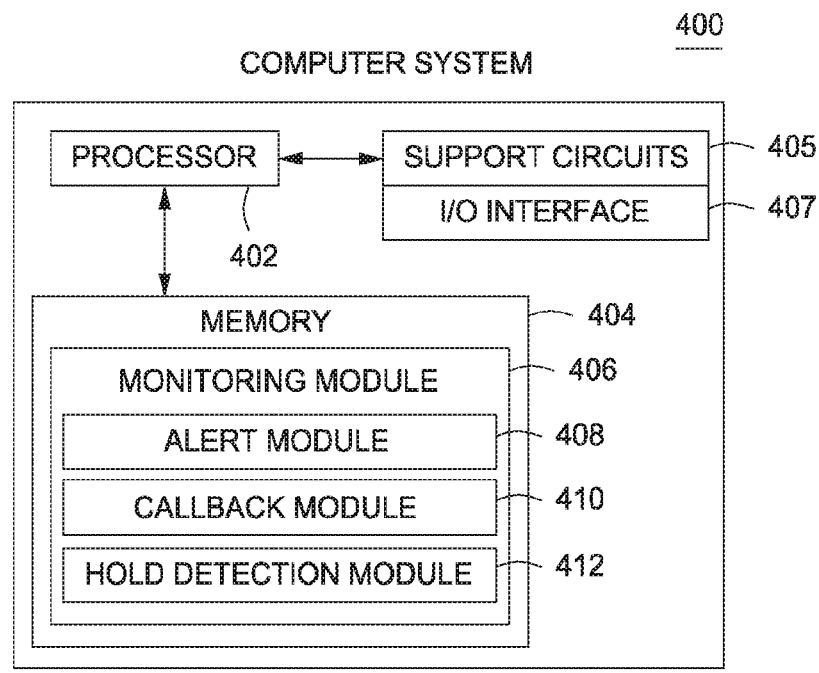
FIG. 4 is a block diagram of a computer system in accordance with exemplary embodiments of the present invention.

FIG. 4 is a block diagram of a computer system 400 in accordance with exemplary embodiments of the present invention. The computer system 400 includes a processor 402, various support circuits 405, and memory 404. The processors 402 may include one or more microprocessors known in the art. The support circuits 405 for the processor 402 include a cache, power supplies, clock circuits, data registers, I/O interface 407, and the like. The I/O interface 407 may be directly coupled to the memory 404 or coupled through the support circuits 405. The I/O interface 407 may also be configured for communication with input devices and/or output devices such as network devices, various storage devices, mouse, keyboard, display, video and audio sensors and the like.

The memory 404, or computer readable medium, stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a monitoring module 406. The monitoring module 406 further comprises an alert module 408, a callback module 410 and a hold detection module 412.

The computer system 400 may be programmed with one or more operating systems 420, which may include OS/2, LINUX, SOLARIS, UNIX, HPUX, AIX, WINDOWS, IOS, and ANDROID among other known platforms.

The memory 404 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 5:
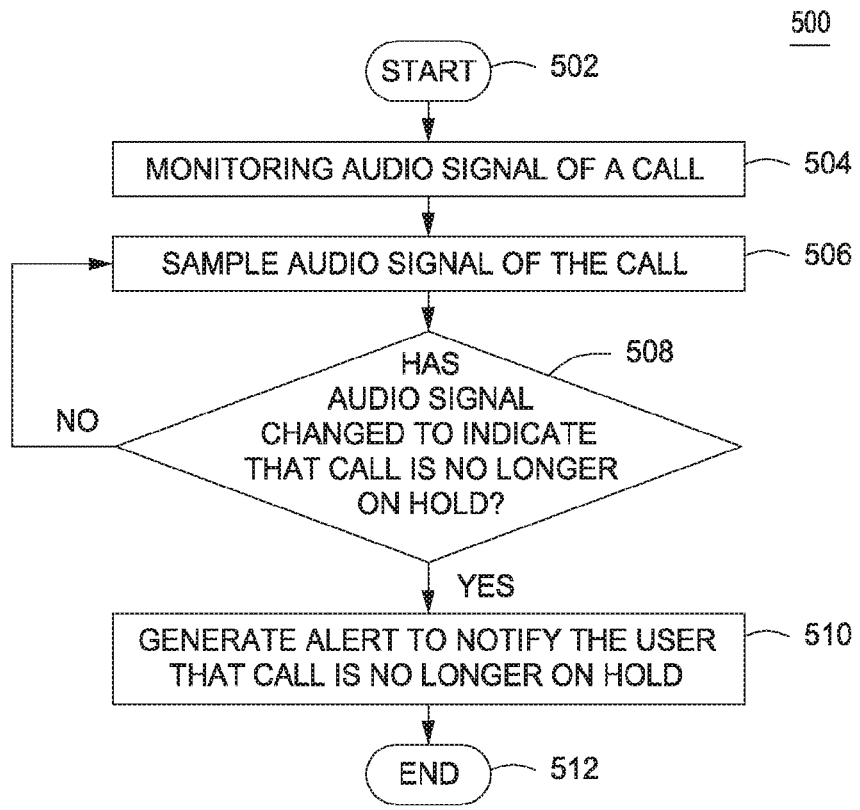
FIG. 5 is a flow diagram of a method for detecting completion of a wait-time on a customer support line in accordance with exemplary embodiments of the present invention.

FIG. 5 is a flow diagram of a method for detecting completion of wait-time on a customer support line in accordance with exemplary embodiments of the present invention. Method 500 illustrates an exemplary flow of the monitoring module 406 stored in memory 404 and executed by the processor 402 of computer system 400.

The method begins at step 502 and proceeds to step 504. At step 504 the monitoring module 406 monitors a support call between the customer and a support line. The method then proceeds to step 506 where the audio portion of the call is sampled by the hold detection module 412. At step 508, the hold detection module 412 determines whether the music has terminated based on the sampling of the audio signal. For example, in some embodiments, the hold detection module 412 determines whether the sampled audio contains music that has been interrupted or ended. If at step 508, the music is still playing, the method returns to step 506 and continues sampling the audio signal. If at step 508 the monitoring module 406 determines that the music has terminated based on the sampling of the audio signal, the method 500 proceeds to step 510.

In some embodiments, the hold detection module 412 compares the sample the audio to previously sampled audio to determine whether there is a match. If currently sampled audio is empty and the previously sampled audio contains music, then it is assumed that the customer is no longer on hold, according to one embodiment. In another embodiment, if the hold detection module 412 detects speech, then it is determined that the CSR has engaged the call. At step 510, the alert module 408 generates an alert to notify the customer that they're no longer on hold. According to exemplary embodiments, the alert maybe a graphical alert or an audio alert. The alert is transmitted to the customer's device, or one or more alternate device associated with the customer as shown in FIG. 3. The method terminates at step 512.

While the foregoing is directed to embodiments of the present invention, other and further embodiments of the invention may be devised without departing from the basic scope thereof, and the scope thereof is determined by the claims that follow.

The invention claimed is:

1. A method for informing a user that a call is no longer on hold, comprising:
    monitoring an audio signal of a call that has been placed on hold between a first device associated with the user and a first entity;
    determining a change in the monitored audio signal that indicates that the call is no longer on hold, wherein the change in the monitored audio signal that indicates that the call is no longer on hold comprises detecting speech of a live representative associated with the first entity;

sampling the detected speech of the representative;
converting the speech of the representative into text; and
transmitting the text to a device associated with the user.

2. The method of claim 1, wherein the change in the monitored audio signal that indicates that the call is no longer on hold comprises detecting completion of hold music or detecting speech of a live representative associated with the first entity.

3. The method of claim 2, wherein the change in the monitored audio signal comprises detecting the speech of the live representative, and wherein an automated message is played back to the live representative upon detection of the speech of the live representative.

4. The method of claim 1, further comprising generating an alert to inform the user that the call is no longer on hold.

5. The method of claim 4, wherein the alert comprises a graphical portion to be displayed on the first device.

6. The method of claim 4, wherein the alert is an audio notification set by the user to be one of a ringtone, notification tone, or a predefined tone associated with the first device.

7. The method of claim 1, further comprising:
transmitting an alert to one or more alternate devices associated with the user.

8. The method of claim 1, further comprising:
transmitting a voice message to a live representative associated with the first entity.

9. The method of claim 1, further comprising:
enabling a speaker-phone mode of the first device when it is determined that the call is no longer on hold.

10. The method of claim 4, further comprising:
receiving an indication that the alert is generated while the call is still on hold;
and adapting the monitoring of the signal based on the indication received.

11. A system for alerting a user that a call is no longer on hold, comprising:
a) at least one processor;
b) at least one input device; and
c) at least one storage device storing processor-executable instructions which, when executed by the at least one processor, perform a method including:
(1) monitoring an audio signal of a call that has been placed on hold between a first device associated with the user and a first entity;
(2) determining a change in the monitored audio signal that indicates that the call is no longer on hold, wherein the change in the monitored audio signal that indicates that the call is no longer on hold comprises detecting speech of a live representative associated with the first entity;
(3) sampling the detected speech of the representative;
(4) converting the speech of the representative into text; and
(5) transmitting the text to a device associated with the user.

12. The system of claim 11, wherein the change in the monitored audio signal that indicates that the call is no longer on hold comprises detecting completion of hold music or detecting speech of a live representative associated with the first entity.

13. The system of claim 12, wherein the change in the monitored audio signal comprises detecting the speech of the live representative, and wherein the method further comprises playing back an automated message to the live representative upon detection of the speech of the live representative.

14. The system of claim 11, further comprising generating an audio alert to inform the user that the call is no longer on hold.

15. The system of claim 14, wherein the audio alert further comprises a graphical portion to be displayed on the first device.

16. The system of claim 14, wherein the audio alert is an audio notification set by the user to be one of a ringtone, notification tone, or a predefined tone associated with the first device.

* * * * *